United States Patent [19]

Heyraud et al.

[11] 4,084,502
[45] Apr. 18, 1978

[54] ELECTRIC ACUTATING DEVICE

[75] Inventors: Marc Heyraud, Les Geneveys-sur-Coffrane; André Martin, La-Chaux-de-Fonds, both of Switzerland

[73] Assignee: Portescap, La Chaus-de-Fonds, Switzerland

[21] Appl. No.: 682,796

[22] Filed: May 3, 1976

[30] Foreign Application Priority Data

May 2, 1975 Switzerland .................... 5691/75

[51] Int. Cl.$^2$ .............................. H01F 7/08
[52] U.S. Cl. ................. 101/93.29; 335/272; 310/36
[58] Field of Search ........... 101/93.09, 93.29, 93.30, 101/93.31; 335/272, 282, 299; 310/36, 166, 42

[56] References Cited

U.S. PATENT DOCUMENTS

| 3,001,107 | 9/1961 | Rhodes | 335/272 |
| 3,138,427 | 6/1964 | Stein et al. | 335/282 X |
| 3,289,133 | 11/1966 | Bieger et al. | 335/272 X |
| 3,378,799 | 4/1968 | Ouellette | 335/272 |
| 3,406,625 | 10/1968 | Chamness et al. | 101/93.09 |
| 3,486,148 | 12/1969 | Christensen | 335/272 |
| 3,501,726 | 3/1970 | Olesen | 335/272 |
| 3,827,543 | 8/1974 | Kawano et al. | 335/272 |
| 3,929,067 | 12/1975 | Nishikawa et al. | 101/93.3 |
| 3,970,979 | 7/1976 | Montagu | 310/36 |
| 3,970,980 | 7/1976 | Nelson | 335/272 |

FOREIGN PATENT DOCUMENTS 2,217,958  10/1973  Germany ........................ 310/36

OTHER PUBLICATIONS

IBM Tech. Discl. Bull., "Single-Turn Moving Coil Print Magnet," vol. 13, No. 12, May 1971, p. 3767.

*Primary Examiner*—E. H. Eickholt
*Attorney, Agent, or Firm*—Cushman, Darby & Cushman

[57] ABSTRACT

An electric actuating device for producing limited angular displacements comprising an ironless cylindrical coil mounted for rotation in an air gap of a magnetic circuit, the magnetic circuit being formed by a permanent magnet placed inside the coil and an outer part of magnetically permeable material surrounding the coil. The coil is connected through spiral springs to a source of electric control pulses. The spiral springs provide a return force for bringing the coil back to a rest position in the absence of a control pulse. Means are provided for limiting the angle of rotation of the coil.

7 Claims, 2 Drawing Figures

ELECTRIC ACUTATING DEVICE

BACKGROUND OF THE INVENTION

The present invention concerns an electric actuating device for producing limited angular displacements. Actuating devices of this kind are used for instance in control and regulating installations, in machine tools, in office machines, in printing devices and generally in all applications where a rotational motion over a given limited angle is to be produced.

Known actuating devices of this kind make use of an electromagnet for providing the angular movement and present therefore a number of disadvantages. In particular the inductance of those devices is relatively important and this results in an electric time constant which is too great for many applications. Furthermore they have a poor relationship torque/moment of inertia and torque/volume, so that these devices are not economically satisfactory and their performance is limited.

OBJECTS AND SUMMARY OF THE INVENTION

The principal object of the present invention is to avoid the above mentioned disadvantages.

The device according to the invention comprises an ironless coil which is arranged for rotation in the air gap of a magnetic circuit and connected to an electric control device producing control pulses, the poles of the magnetic circuit and the winding of the coil being arranged for producing a driving torque upon occurrence of a control pulse, and further comprises mechanical means for limiting the rotational movement of the coil at least in the direction of the driving torque and means for producing a return torque acting on the coil to bring the same back to a rest position.

The coil can be of cylindrical shape and comprise a self supporting winding mounted on one end thereof on a supporting disk. The magnetic circuit comprises preferably a permanent magnet placed inside the coil with the direction of its flux perpendicular to the axis of the coil and further comprises a cylindrical part of magnetically permeable material surrounding the coil.

The mechanical means for limiting the rotational movement of the coil can comprise at least one limit stop cooperating with a mechanical member fixed to the coil.

The means for producing a return torque can be mechanical means in the form of return springs, magnetic means or a combination of mechanical and magnetic means.

The device according to the invention can be used as a device for operating the striker of a printing device and more particularly for the striker of a chronocomparator for instance in the place of the device described in U.S. Pat. No. 2,229,077.

BRIEF DESCRIPTION OF THE DRAWINGS

The present invention will be better understood with resference to the detailed description of exemplary preferred embodiments thereof taken in conjunction with the accompanying drawings in which.

DETAILED DESCRIPTION

Figure 1:
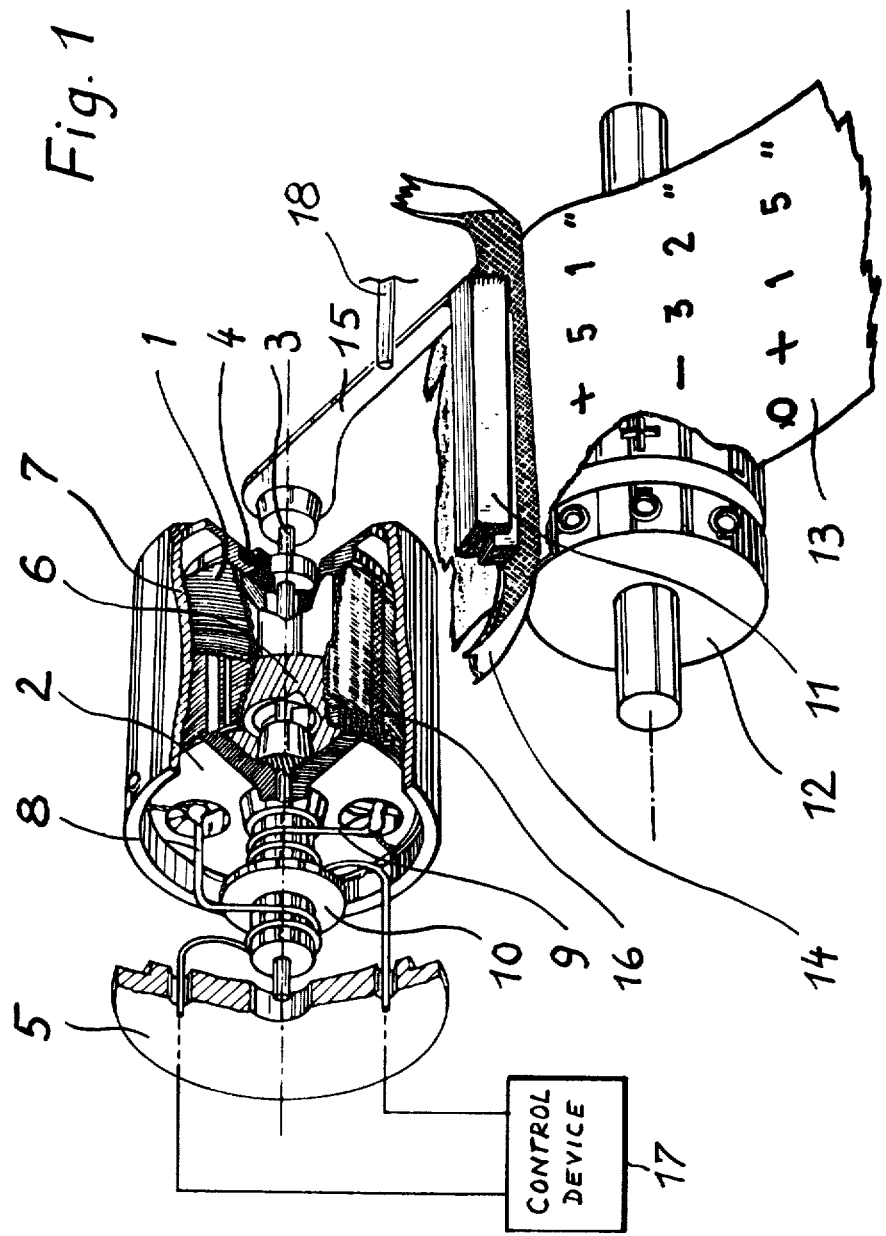
FIG. 1 is a perspective view of the main parts of a cypher printing device with some parts shown in section or separately.

The operating device shown in FIG. 1 comprises a rotatable coil being part of a cup-shaped rotor as used in dc-micromotors. The shown coil 1 of cylindrical shape is self supporting and fixed on one of its ends upon supporting disk 2, the latter being mounted on an axes 3. The ends of axis 3 are supported for rotation respectively in a stationary part 4 of the device and in a cover 5 of the housing thereof.

The magnetic circuit is that of a dc-micromotor of the type comprising a cup-shaped rotor as mentioned above. A permanent magnet 6 is placed inside of the coil with its direction of magnetization extending in the direction of a diameter of the coil, and an outer cylindrical part 7 of magnetically permeable material is surrounding the coil, the parts 6 and 7 defining an air gap in which coil 1 is mounted for rotation.

In usual dc-micromotors with continuously rotating rotor the ends of the winding are electrically connected to two corresponding bars of a collector. In the present device the same ends of the winding are connected to the ends of two spiral springs 8, 9 the said ends of the springs being flexed to the supporting disk 2. The other ends of springs 8 and 9 are fixed to the cover 5, the spiral parts of the springs surrounding axis 3 and being electrically insulated from each other and from the axis by means of an insulating member 10. The function of the spiral springs 8 and 9 is to provide an electrical connection between the coil and a source of driving pulses 17 and further to provide a return torque for bringing the coil back to its rest position after the end of a driving pulse.

A striker 11 cooperates in a well known manner with a printing cylinder 12, a strip of printing paper 13 and a colouring ribbon 14. The striker is connected to axis 3 by means of a lateral arm 15. A schematically shown stop 18 defines the rest position of the coil and the striker in the absence of a driving or control pulse.

In operation, when an electric control pulse is applied to the coil over springs 8 and 9, a driving torque is produced which rotates coil 1 together with arm 15 until the striker contacts the printing cylinder. At the end of the driving pulse the return springs bring the whole movable system back to the rest position.

The return force can be produced through different kinds of springs, for instance concentric springs, laminated springs or straight spring bars, all these springs being arranged to act on an appropriate part of the movable system. To reach optimal conditions during the acceleration period for the striking as well as during the return to the rest position, the return force is preferably variable as a function of the angular position of the coil.

According to another embodiment of the actuating device the return force is at least in part produced by magnetic means. To this effect the coil bears a thin bar of soft iron 16 extending parallely to the axis of the coil in a manner to cooperate with one of the poles of magnet 6. The position of bar 16 is preferably determined so as to provide a return force of sufficient value in the vicinity of the rest position thereby compensating the reduction of the force of the return springs in this region.

The use of a combination of mechanical and magnetic means allows the return force which is variable as a function of the angular position of the coil to be optimally adapted for a given application. The mechanical return means generally produce a return force increasing with the angle of rotation from the rest position while the magnetic return means produce a return force decreasing in the same direction. The combination of both means therefore provides the possibility to define and to adjust the course of the variation of the return force in a very simple manner. For instance, the actuating device can thereby be adapted for operation in opposite directions of rotation with a middle rest position and over large angles of rotation.

Figure 2:
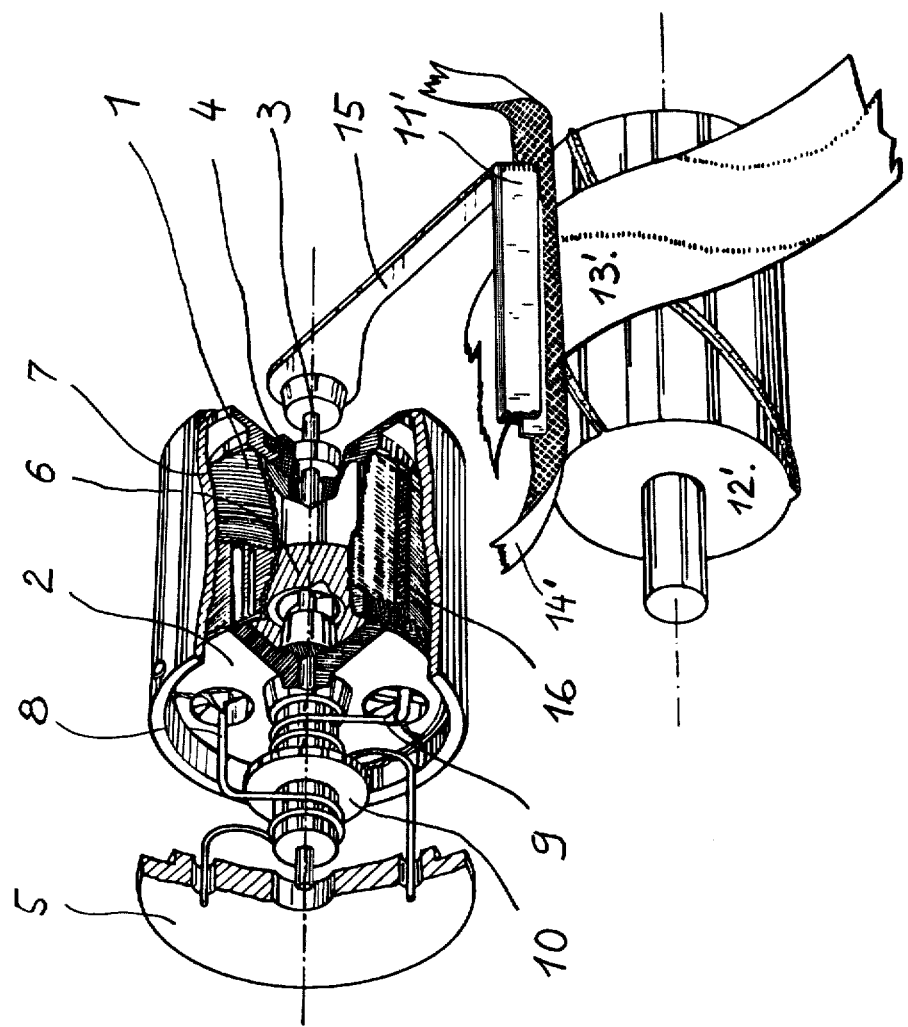
FIG. 2 is a similar view of a printing device for a chronocomparator.

FIG. 2 shows the device in a similar application as in FIG. 1, the printing cylinder 12 being replaced by a cylinder 12' with a helical rib as generally used in chronocomparators. The cylinder 12' is rotating with constant speed and produces the registration of a point on the strip 13' at each operation of the striker 11'. In this application the acceleration of the striker is even greater than that of the coil as the striker moves on a large radius than the coil and its mass is relatively small with respect to the entire mass of the movable system. The present actuating device can be placed on the side of the printing cylinder 12' as it is desired from a constructional point of view. This also allows a direct instantaneous reading of the printed points thanks to the fact that the surface of strip 13' covered by the striker is reduced to a minimum.

With respect to the known actuating devices with moving magnets the device according to the invention has the following important advantages:

The inductance is smaller and therefore the electric time constant shorter, generally by at least one order of magnitude than in the known devices.

The electric power required for the operation of the device is smaller, a feature which is particularly important when electronic control devices are used.

The ratio torque/moment of inertia and torque/volume is considerably increased. Therefore, when an actuating device of given performance is required a more economic control device can be used or, when the output of the control device is given the actuating device reaches much higher performance.

It is further to be noted that the actuating device according to the invention allows the use of elements of already existing dc-micromotors with ironless rotor. This leads to a reduction of the manufacturing costs, as the corresponding parts can be produced in larger series.

While an exemplary embodiment of an actuating device in accordance with this invention has been particularly described, it should be apparent to those skilled in this art, that various substitutions and modifications may be made to this embodiment without departing from the true spirit and scope of this invention.

We claim:

1. An electric actuating device for producing limited angular displacements, comprising an ironless coil mounted for rotation within the air gap of a magnetic circuit and connected to a source of electric control pulses, the poles of the magnetic circuit and the coil being arranged for producing a torque upon occurrence of a control pulse, and further comprising mechanical means for limiting the angle of rotation at least in the direction of the torque and magnetic return means for producing a return torque acting on the coil for bringing the same back into a rest position, said magnetic return means comprising a member of magnetically permeable material associated with the rotor for rotation therewith, at least a part of said member being arranged in eccentric relationship with the rotor axis.

2. A device in accordance with claim 1 wherein the coil is part of a cup shaped rotor and comprises a self supporting cylindrical winding fixed at its one end onto a supporting disk, and wherein the magnetic circuit comprises a permanent magnet placed inside the coil and a soft iron cylindric outer part surrounding the coil.

3. A device in accordance with claim 1 which further includes two return springs electrically connected between the ends of the coil and the source of control pulses, said return springs cooperating with said magnetic return means for bringing said coil back into a rest position.

4. A device in accordance with claim 3 wherein the two return springs are spiral springs surrounding the axis of the coil and separated from each other through an insulating member.

5. A device in accordance with claim 1 wherein the mechanical means for limiting the rotational movement comprise at least one limit stop cooperating with a mechanic member fixed to the coil.

6. A device in accordance with claim 1 including a striker connected through a radial arm with the coil and further including a printing cylinder adapted to cooperate with the striker.

7. An electric actuating device for producing limited angular displacements, comprising an ironless coil mounted for rotation within the air gap of a magnetic circuit and connected to a source of electric control pulses, the poles of the magnetic circuit and the coil being arranged for producing a torque upon occurrence of a control pulse, and further comprising mechanical means for limiting the angle of rotation at least in the direction of the torque and magnetic return means for producing a return torque acting on the coil for bringing the same back into a rest position, wherein said magnetic return means comprises at least one bar of magnetically permeable material, the said bar being arranged on the surface of the coil parallely to the axis thereof and for rotation therewith for producing a magnetic return force in cooperation with the magnetic circuit for bringing the coil back into a rest position.

* * * * *